United States Patent [19]
Saito et al.

[11] 4,334,749
[45] Jun. 15, 1982

[54] CAMERA HAVING AN ELECTROMAGNETICALLY DRIVEN SHUTTER

[75] Inventors: Syuichiro Saito; Nobuaki Date; Ryoichi Suzuki, all of Kawasaki; Yoji Sugiura, Yokohama, all of Japan

[73] Assignee: Canon Kabushiki Kaisha, Tokyo, Japan

[21] Appl. No.: 228,318

[22] Filed: Jan. 26, 1981

[30] Foreign Application Priority Data

Jan. 25, 1980 [JP] Japan .................................. 55-7644

[51] Int. Cl.³ .............................................. G03B 9/08
[52] U.S. Cl. ..................................... 354/234; 354/247
[58] Field of Search ................. 354/234, 235, 245–249

[56] References Cited

U.S. PATENT DOCUMENTS

| | | | |
|---|---|---|---|
| 3,673,942 | 7/1972 | Tingley | 354/234 |
| 4,149,794 | 4/1979 | Takahama et al. | 354/234 |
| 4,220,409 | 9/1980 | Inoue | 354/247 |
| 4,268,153 | 5/1981 | Sugiura et al. | 354/234 |

Primary Examiner—Russell E. Adams
Attorney, Agent, or Firm—Toren, McGeady & Stanger

[57] ABSTRACT

A camera having an electromagnetic driving source for operating a focal plane shutter in the camera, includes a shutter base plate and a driving arm pivoted on the base plate for swinging movement in a plane parallel to the plate. A group of thin shutter blades are supported on the driving arm parallel to the surface of the base plate. The output shaft of a motor is coupled with the driving arm, and either one of the rotor of the motor, or a permanent magnet forming a part of the stator of the motor, provides magnetic flux parallel to the axis of the output shaft, thereby causing the rotor to rotate the output shaft and drive the focal plane shutter.

2 Claims, 7 Drawing Figures

CAMERA HAVING AN ELECTROMAGNETICALLY DRIVEN SHUTTER

BACKGROUND OF THE INVENTION

1. Field of the Invention

The present invention relates to a camera, particularly to a camera having a focal plane shutter in which the shutter is driven by an electromagnetic driving source.

2. Description of the Prior Art

Heretofore, running of shutter screens in a camera has been done by a mechanical driving source such as a spring, or the like. On the other hand, recently use of electronics in a camera has advanced and there has been a tendency to electrically control an exposure and a photographing sequence, etc. Therefore, since a driving system for a shutter has a mechanical arrangement even in a camera which has advanced electronics technology employed therein, there has been the shortcoming of having a complicated arrangement for the total camera. Thus quite recently a camera having an electromagnetic driving source in which a running of a shutter screen is made directly by electromagnetic power has been proposed.

However, when a motor is used as an electromagnetic driving source, it is difficult to use a large size motor because of a limited space available within a camera for housing the same.

When a focal plane shutter having a leading blade group and a rear blade group each of which consists of a plurality of divided blades (for example, as disclosed in U.S. Pat. No. 4,024,555) is used, it is desirable to place a motor at a side of an exposure aperture opening in such a manner that a shaft of the motor is perpendicular to the film plane.

Figure 1:
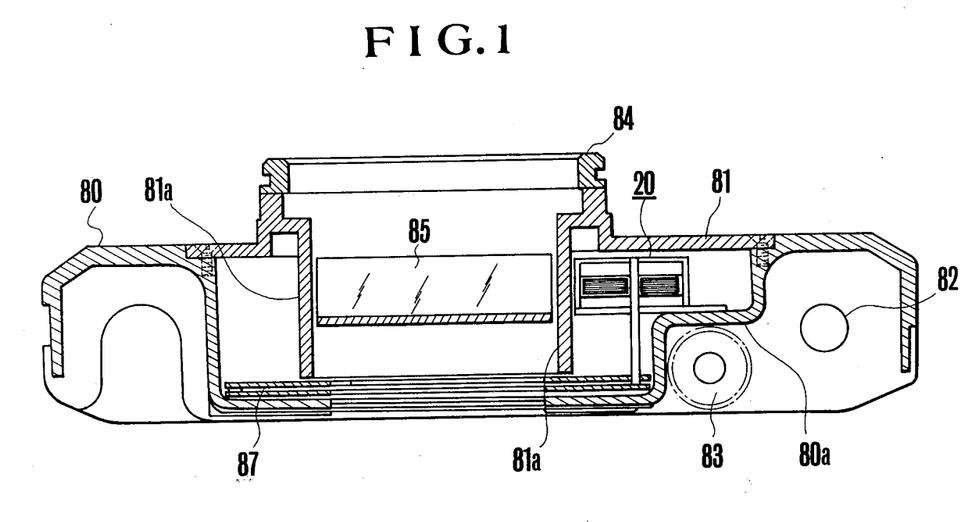
FIG. 1 is a laterally cross sectional view of a single lens reflex camera to which the present invention is applied.

In a generally known type of a single lens reflex camera using a 35 mm film, a sprocket is provided between a mirror box and a wind up shaft as shown in FIG. 1, and a distance between the sprocket and the mirror box needs to be extended in order to house a motor within said space, but it makes a lengthwise dimension of the camera longer, which is not desirable. Therefore, a motor is placed between the sprocket and a front plate of the camera, and in this case the distance between the front plate and a partition wall of a sprocket part is short. Therefore, a height of a motor, that is, its dimension in its axial direction, needs to be made small.

SUMMARY OF THE INVENTION

The present invention employs a flat type motor to allow for housing the motor within a small space as mentioned above, and yet actuating a shutter with sufficient driving power.

In an example of the present invention such a motor arrangement is employed that a plurality of movable coils are sandwiched between two magnets having large magnetic pole face areas compared to their thicknesses, and the movable coils are made to rotate within magnetic flux which is provided parallel to an output shaft axis of the motor.

Also in another example of the present invention means are provided for converting the magnetic flux of a flat movable magnet, which rotates within a field coil, forcibly to a right angle direction from the magnet, so that a shutter can be driven by a flat motor by effectively utilizing the magnetic flux.

Now the examples of the present invention will be explained by referring to the drawings attached.

DESCRIPTION OF THE PREFERRED EMBODIMENTS

Figure 2:
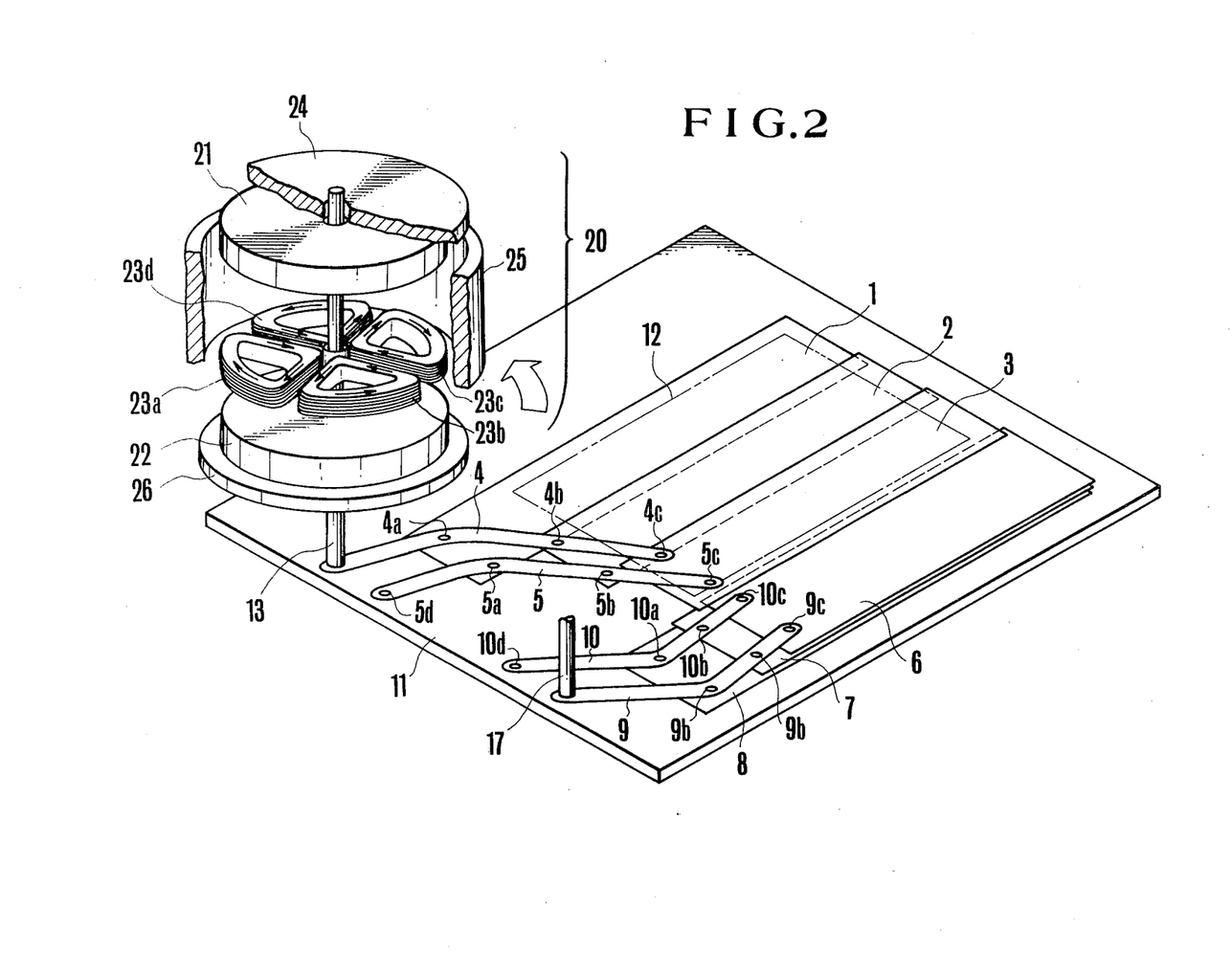
FIG. 2 is an oblique view to show an example of an electromagnetic driving source and a shutter mechanism constituting a camera according to the present invention.

FIG. 1 shows an arrangement within a single lens reflex camera, including a camera body 80, a film wind up shaft 82, and a sprocket 83 for advancing a film. A front plate 81 having a lens mount 84 is attached to a front plane of the camera body, and a mirror box 81a which swingably supports a reflective mirror 85 of a known type is integrally provided in the rear of the front plate. Also shown is a focal plane shutter 87 to be described later, and a shutter driving motor 20 is provided at a partition wall 80a of the camera body on a base plate 26. FIG. 2 is an oblique view to show an arrangement of a focal plane shutter and a motor.

The drawing shows a shutter base plate 11 having an exposure window 12, a leading blade driving arm 4 and an auxiliary arm 5. The arm 4 is fixed at its one end with a leading blade driving shaft 13. Shaft 13 and arm 4 are pivoted at the shutter base plate in a freely rotatable manner. Also the auxiliary arm 5 has its one end pivoted at the shutter base plate in a freely rotatable manner by a pin 5d. A leading blade group of thin plate-like blades 1, 2 and 3 having light shielding properties are pivoted at these arms 4 and 5 respectively by pins 4a, 4b, 4c, 5a, 5b and 5c in a freely rotatable manner.

FIG. 2 also shows a rear blade driving arm 9 an auxiliary arm 10. The arm 9 is fixed to a rear blade driving shaft 17 at its one end. Arm 9 and shaft 17 are pivoted at the shutter base plate in a freely rotatable manner. The auxiliary arm 10 has its one end pivoted at the shutter base plate by a pin 10d in a freely rotatable manner. A rear blade group of thin plate-like blades 6, 7 and 8 having light shielding properties are pivoted at arms 9, 10 in a freely rotatable manner respectively by pins 9a, 9b, 10a, 10b and 10c.

A flat motor 20 acts as an electromagnetic driving source. In the motor 20, movable coils 23a, 23b, 23c and 23d are divided into four parts forming a rotor of the motor. Said coils are fixedly provided at the output shaft 13 for driving the leading blades. The movable coils divided into four parts are so connected that current flows in such a manner that directions of current are in reverse in parts adjacent to each other when power is supplied thereto. Permanent magnets 21 and 22 form a stator, and each of the magnets is magnetized in such a manner that directions of magnetic flux are in reverse to each other in adjacent parts of the four divided parts as shown in FIG. 3.

Figure 3:
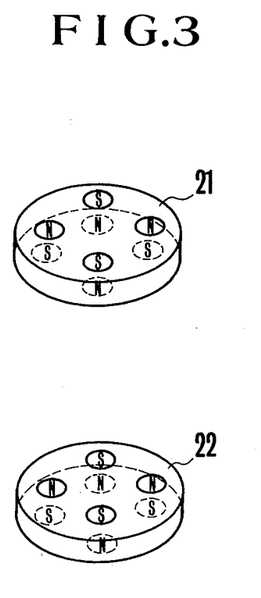
FIG. 3 is an arrangement diagram to show a state of magnetization of magnets constituting the electromagnetic driving source shown in FIG. 1.

Also the magnets 21 and 22 are so provided that magnetic poles having different polarity to each other face to each other as shown in FIG. 3. A motor housing 24, 25 a motor base plate 26 also serve as a yoke, forming a magnetic circuit. The motor is fixedly provided at the partition wall part 80a of the camera body mentioned above through the base plate 26.

Since the flat motor 20 has the above-mentioned arrangement, when power is supplied to the coils 23a, 23b, 23c and 23d driving power will be generated according to Fleming's left hand rule. That is a driving power in a radius direction will be generated at the coil at a circumferential part, and said driving power works symmetrically against the shaft 13, thus their resultant force will become zero. And power is generated in a direction of tangent at the coil at a radius part and driving force at each part will have one common direction. Therefore, the driving force works as a force couple against the shaft 13 and the shaft 13 well rotates in a direction shown by a wide arrow. While FIG. 2 shows only the electromagnetic driving source for driving leading blades, the rear blade driving shaft 17 also has the same motor as the above-mentioned flat motor 20 as the driving source fixed thereto.

Figure 4:
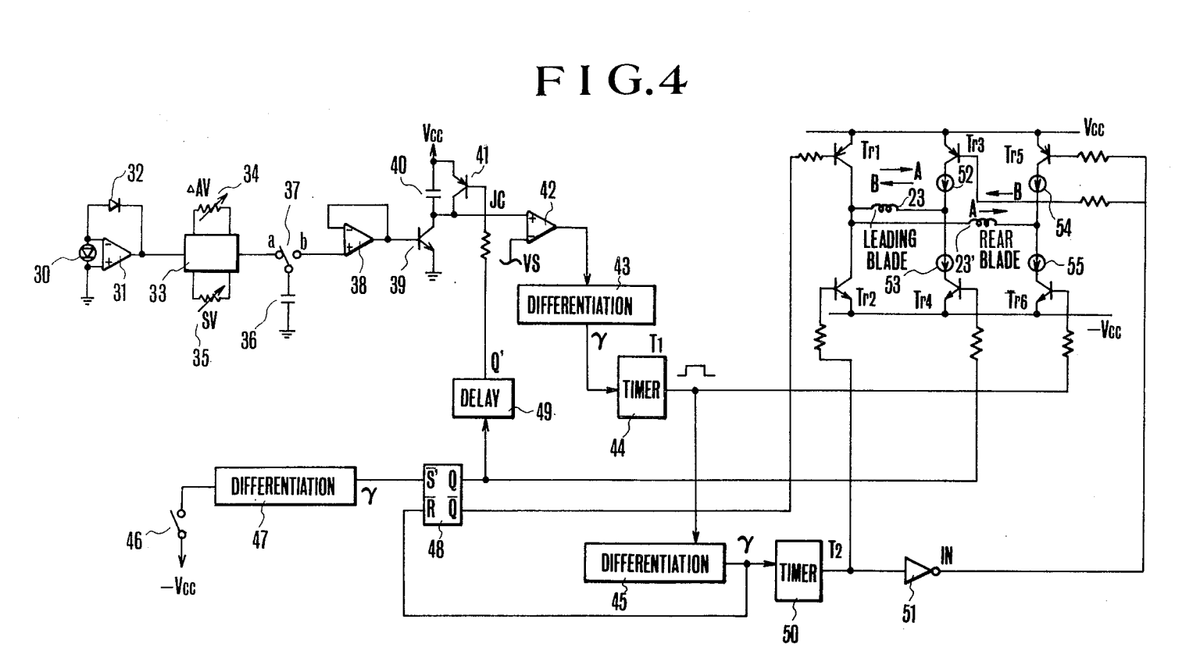
FIG. 4 is a circuit diagram to show an example of a control circuit which controls the electromagnetic driving source of FIG. 2.

FIG. 4 is a circuit diagram to show an example of a control circuit for controlling the shutter mechanism shown in FIG. 1. The diagram shows a photo-voltaic element 30 (SPC), an operational amplifier 31 (hereinafter called as OP amp in brief) forming a SPC head amplifier, and the SPC 30 is connected to both input terminals of the amplifier, and a diode 32 for logarithmic compression is connected in a negative feedback path of the amplifier. Also shown is an operational circuit 33 of known type, a variable resistance 34 for setting stop down step number information (ΔAv) for a preset diaphragm aperture, a variable resistance 35 for setting ASA sensitivity information (Sv) of a film used, wherein shutter time information (Tv) to be controlled is provided from the output of the operational circuit 33, a capacitor 36 for memorizing the Tv information, and a change over switch 37 which is usually in contact with a contact "a" and is changed over to a contact "b" in association with the start of upward movement of a quick return mirror not being shown in the drawing. An operational amplifier 38 forms a voltage follower, and a transistor 39 for logarithmic expansion has a capacitor 40 for time constant connected to its collector. A switching transistor 41 starts counting, and an operational amplifier 42 forms a comparison circuit, a non-inversion input thereof is connected to the collector terminal of the above-mentioned expansion transistor 39, and a reference voltage Vs is applied to the inversion input thereof. A differentiation circuit 43 is connected to an output of the comparison circuit 42, and a timer circuit 44 is triggered by negative differentiation pulses of the differentiation circuit 43 and maintains an output with a high level for a certain period of time (for example 20 ms). A differentiation circuit 45 is connected to an output of said circuit 44.

A normally open switch 46 is closed by completion of the upward movement of the quick return mirror not being shown in the drawing, and negative differentiation pulses are generated from a differentiation circuit 47 in the next stage by the closing of the switch. An RS flip-flop circuit 48 has its set input connected to an output of the differentiation circuit 47, while a delay circuit 49 is connected to a Q-output terminal of the flip-flop circuit 48. Also an output Q' of the delay circuit 49 is connected to a base of the switching transistor 41 for starting the counting through a resistance.

A timer circuit 50 is connected to an output of the differentiation circuit 45, and is triggered by negative differentiation pulses from the differentiation circuit 45 to maintain an output with a high level for a certain period of time (for example 20 ms). An inverter 51 is connected to an output of the timer circuit 50. Transistors Tr1 to Tr6 constitute a driving circuit to flow driving current to the driving coils 23a to 23d for the electromagnetic driving source for the shutter leading screen shown in FIG. 1, and to the driving coil 23' of the electromagnetic driving source for the shutter follower screen not being shown in the drawing. The transistors Tr1, Tr2, Tr3 and Tr4 constitute a bridge arrangement against the driving coil 23 to control a direction of current flowing to the driving coil. Also the transistors Tr1, Tr2, Tr5 and Tr6 constitute a bridge arrangement against the driving coil 23' and control a direction of current flowing to the driving coil. Also a constant-current circuit 52–55 is connected to the driving circuits. While the coils 23a to 23d shown in FIG. 2 are represented in FIG. 4 as a single coil for a benefit of simplification of explanation, actually they consist of coils divided into four parts as shown in FIG. 2.

Next, explanations will be made on function of FIGS. 1 to 4.

Now, if it is supposed that a release button not being shown in the drawings is pressed down, power is supplied to the circuit shown in FIG. 4 from a power source not being shown in the drawing, placing the circuit shown in FIG. 4 in an active state. After that when the release button is further pressed down, the mirror not being shown in the drawings will go up by a well known mechanism, and the switch 36 is changed over from the contact "a" to a connection to the contact "b". On the other hand, the amplifier 31 has been in active state from a time of the initial power supply, and has been outputting such voltage as corresponding to an object brightness Bv and a fully open F value AVo of the lens, and at the same time said output voltage is operated by the operating circuit 33 with the stop down step number information ΔAv of a preset diaphragm aperture value being set at the resistance 34 and with the film sensitivity information Sv being set at the resistance 35. Therefore, a voltage corresponding to the shutter time information Tv has been input into the capacitor 36. Thus the information Tv has been memorized in the capacitor 36 by the above-mentioned function and is transmitted to the amplifier 38 through the contact "b".

Thus, the information Tv is memorized in the capacitor 36 by the mirror up action as has been explained, while the switch 46 becomes ON at the time the mirror up action is completed. By this, the differentiation circuit 47 outputs the differentiation pulses to set the flip-flop circuit 48, and a high level signal will be output from the output terminal Q while a low level signal will be output from the output terminal $\bar{Q}$. Therefore, the transistors Tr1 and Tr2 become ON and current flows to the driving coil 23 23a to 23d in FIG. 2) as shown in FIG. 2, then the shaft 13 rotates to a counterclockwise direction as explained above. By this, the arm 4 also rotates to a counterclockwise direction and the shutter leading screen blades 1, 2 and 3 open the shutter aperture opening to start an exposure.

Also, when the flip-flop circuit 48 is set as mentioned above the delay circuit 49 outputs a high level signal after a delay of a predetermined length of time, placing the transistor 41 in OFF state. Thereby the capacitor 40 starts charging by the collector current of the transistor 39. Since the base of the transistor 39 is connected to the output terminal of the amplifier 38, the above-mentioned collector current corresponds to a logarithmically expanded value of the information Tv memorized in the capacitor 36.

Therefore, the capacitor 40 is charged according to a shutter time value determined based on an object brightness, and after an elapse of such length of time that voltage charged at 40 becomes to correspond to the above-mentioned value Tv, the comparison circuit 42 is inversed against Vs to trigger the differentiation circuit 43. Therefore, the differentiation circuit 43 outputs differentiation pulses to trigger the timer circuit 44, which outputs a high level signal for a predetermined length of time. Thereby the transistor Tr6 becomes ON and driving current flows to the driving coil 23' in a direction of an arrow A through the transistors Tr1, Tr6, and the shaft 17 rotates to a counterclockwise direction by an electromagnetic driving source for the shutter follower screen not being shown in the drawings but having the same arrangement as the electromagnetic driving source shown in FIG. 2, then the shutter rear blades 6, 7 and 8 are closed to complete an exposure. Here, the length of time during which the timer circuit 44 outputs a high level signal is set a little longer than a length of time required for the shutter rear blades to complete their running after they start the running, for insuring a shutter closing action.

As has been explained after the shutter rear blades run and an exposure is completed, a low level signal is output from the timer circuit 44 and a resetting action of the shutter screen is done. That is, as a low level signal is output from the timer circuit 44 the differentiation circuit 45 is triggered to output the differentiation pulses, resetting the flip-flop circuit 48. Said differentiation pulses from the differentiation circuit 45 further triggers the time circuit 50, and a high level signal is output for a predetermined period of time from the timer circuit, also a low level signal is output from the inverter 51 at the same time. By this the transistors Tr1, Tr4 and Tr6 become OFF, and the transistors Tr2, Tr3 and Tr5 become ON, then current flows to the driving coils 23-23' in a direction of an arrow B. Therefore, the motor shown in FIG. 2 rotates to a direction reverse to the above-mentioned case to rotate the shafts 13, 17, to a clockwise direction. By this, the shutter blades are reset. Here, since a length of time during which the timer circuit 50 makes its output is set a little longer than a length of time required for the shutter leading blades and rear blades to complete their resetting, the resetting action can be done surely. Also, since the value of the output current of the constant current circuit 52 is so set as being greater than the value of the output current of the constant current circuit 54, the value of the current supplied to the coil 23 becomes greater than the value of current supplied to the coil 23', and the resetting action of the shutter screen will be done while the shutter rear blades are pushed by the leading blades, thus the resetting will be carried out in a state in which the shutter is completely closed. As has been explained, as the resetting action of the shutter is completed the output of the timer circuit 50 becomes to have a low level and the all transistors in the driving circuit become OFF, preventing waste of power.

Figure 5A:
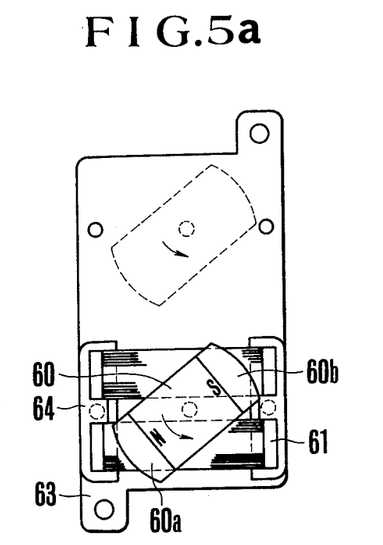
FIG. 5(a) is a plan to show another example of the electromagnetic driving source of FIG. 2.
Figure 5B:
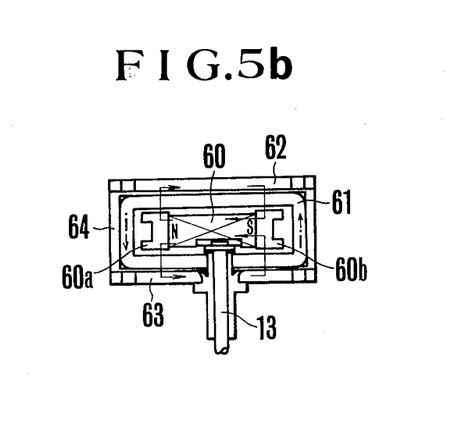
FIG. 5(b) is a cross sectional view of the electromagnetic driving source shown in FIG. 5(a).

FIGS. 5(a) and 5(b) are a plan and a cross sectional view to show another example of a flat motor as an electromagnetic driving source to be applied to a camera having an electromagnetic driving source according to the present invention. In this example, a flat motor of a movable magnet type is employed being different from the example of FIG. 2 and at the same time, a direction of the magnetic flux from the magnet is forcibly changed to a right angle direction to have the magnetic flux from the magnet effectively function, allowing a shape of the motor to become small.

In FIG. 5, a movable magnet 60 drives the leading blades of the shutter through the output shaft 13. A coil 61 forms a stator and two of them are used for one driving part. Also shown is an upper yoke 62 and a motor base plate 63 also serving as a lower yoke. The yoke 63 is attached to the partition wall 80a and integrally combines a bearing of the rotating shaft 13.

The upper yoke 62 is built in integrally with the lower yoke through a supporting stud. A case 64 is provided for fixing the coil and two of them are provided as a pair of left and right ones. Magnetic flux induction iron pieces (electromagnetic mild steel or permalloy) 60a and 60b are attached to the driving magnet 60. The iron piece 60a bends a proceeding direction of the magnetic flux from the pole N of the magnet 60 to a right angle direction and guides the same to the upper yoke 62 and the lower yoke 63. And the magnetic flux passing through the yokes 62 and 63 is bent by the iron piece 60b to right angle direction, forming a magnetic circuit around the magnet 60.

Since the example shown in FIG. 5 has an arrangement mentioned above, as power is supplied to the coil 61 in a drawing, shown in the direction the magnet 60 rotates in a direction of an arrow for rotating the shutter screen blades driving arm shown in FIG. 2 through the shaft 13 to carry out an opening and closing of the shutter.

Since iron pieces which bend the magnetic flux from the magnet forcibly to a right angle direction are provided in the above-mentioned example, the magnetic flux can be made to function effectively, thus a motor as an electromagnetically driving source can be made small. Also the reason why the driving magnet 60 and iron pieces 60a and 60b have different distances from the yokes 62 and 63, is for the purpose of concentration of magnetic flux.

Figure 6:
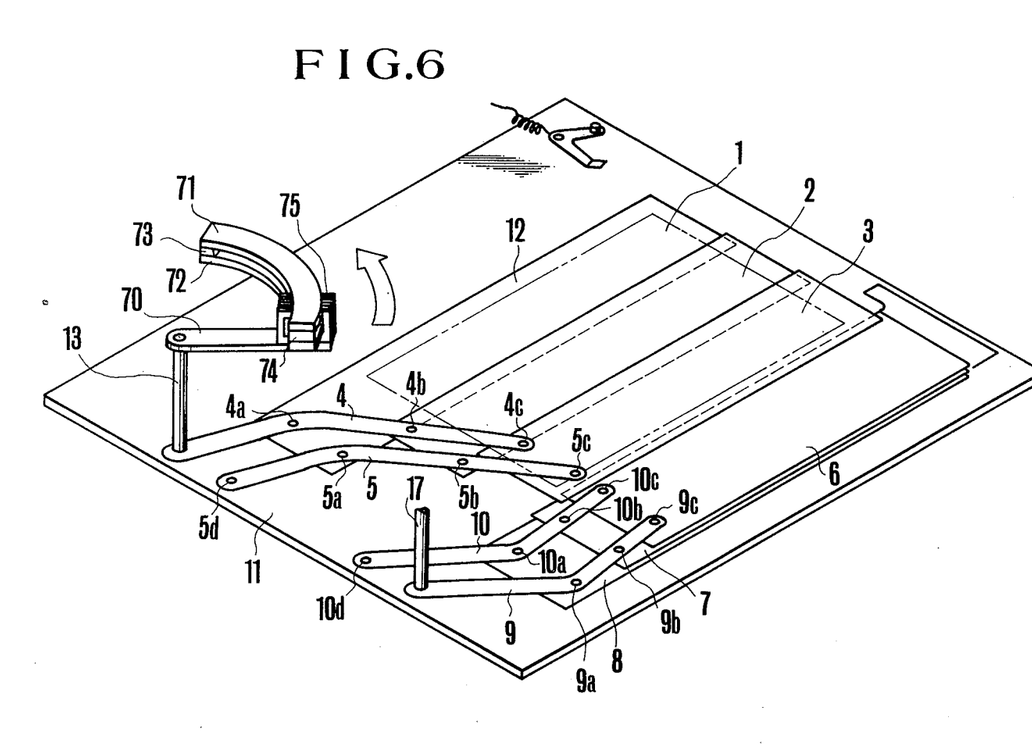
FIG. 6 is an oblique view to show another example of the present invention.

FIG. 6 is an oblique view to show another example of a camera having an electromagnetic driving source according to the present invention, wherein the same component parts as in the example of FIG. 2 are identified with the same numbers. This example is different from the example of FIG. 2 in that a motor of a wide angle meter type is used so that a wide rotation angle can be secured. What is shown in this drawing is a shutter screen blades driving coil 75, and one end of the coil is fixedly provided at a supporting lever 70 fixed to the driving shaft 13. Permanent magnets 73 and 74 are magnetized in an up and down direction that is a direction parallel with the shaft 13 in the drawing. Also shown are yokes 71 and 72, and magnetic poles having same polarity in the magnets 73 and 74 are respectively combined by the yokes 71 and 72.

Also a gap is provided between the yoke 71 and the yoke 72 and a magnetic field is formed in this gap, then a part of the coil 75 is positioned within the magnetic field. Therefore, driving power to a direction of an arrow is generated at the coil 75 by supplying power to the coil, which moves to a direction of the arrow, rotating the shaft 13 to a counterclockwise direction through the supporting lever 70, and running the shutter screen.

While this example has an arrangement including yokes 71, 72 and permanent magnets 73, 74, this arrangement may be reversed as a matter of course. In that case, it is necessary to have the magnet magnetized in an up and down direction and magnetic poles which are different from each other face to each other.

As has been explained above in detail since a flat motor is used as an electromagnetic driving source in a camera according to the present invention, it can be easily provided within the camera.

What is claimed is:

1. A camera having an electromagnetically driven focal plane shutter, when comprises:

a camera body including a front plate a portion of which forms a lens mount, said front plate extending generally in a front plane defined by said camera body on the object side of said camera body;

a film advancing sprocket mounted in said camera body at a given distance from said front plate in the direction toward the rear of the camera body;

a shutter base plate mounted in said camera body and having a film exposure window, said shutter base plate extending generally parallel to and spaced a certain distance apart from said front plate;

a shutter driving arm supported for pivotal movement on said shutter base plate;

a shutter blade group including a plurality of thin plate-like blades pivoted on said shutter driving arm for shutter movement relative to the film exposure window in said shutter base plate; and a flat motor mounted in said camera body at a position between said front plate and said film advancing sprocket for operatively driving said shutter blade group;

said motor comprising a rotor including one of a permanent magnet and a coil, and a stator including the other one of the permanent magnet and the coil; and an output shaft fixed to said rotor and coupled to said shutter driving arm, said permanent magnet being arranged to provide magnetic flux which is parallel to the axis of said output shaft for interacting with said coil to apply driving torque to said output shaft when current flows through said coil.

2. A shutter driving motor comprising:

a frame-type coil for forming a stator;

a generally rectangular shaped permanent magnet, and an output shaft fixed at one end to extend perpendicularly from the center of the plane of said permanent magnet;

bearing means fixed relative to said frame-type coil for rotatably supporting said output shaft so that said permanent magnet is rotatable about the axis of said output shaft within said frame-type coil, said permanent magnet being magnetized in the long direction; and means fixed at each end of said permanent magnet in the long direction of said permanent magnet for bending magnetic flux provided by said permanent magnet in a direction transverse to the long direction of said permanent magnet to interact with said frame-type coil, and for causing a driving torque to be applied to said output shaft by said permanent magnet when current flows through said frame-type coil.

* * * * *